United States Patent [19]

Torbov et al.

[11] Patent Number: 4,960,577
[45] Date of Patent: Oct. 2, 1990

[54] ENHANCED SORBENT INJECTION COMBINED WITH NATURAL GAS REBURNING FOR A SOX CONTROL FOR COAL FIRED BOILERS

[75] Inventors: Tsvetan I. Torbov, San Jose; Howard B. Mason, Los Altos, both of Calif.

[73] Assignee: Acurex Corporation, Mountain View, Calif.

[21] Appl. No.: 152,073

[22] Filed: Feb. 4, 1988

[51] Int. Cl.⁵ ............... B01J 8/00; C01B 17/00; F23B 7/00; F23J 11/00
[52] U.S. Cl. ............... 423/242; 423/244; 110/343; 110/345
[58] Field of Search ........... 423/242 R, 244 A, 244 R, 423/242 A; 110/343, 345

[56] References Cited

U.S. PATENT DOCUMENTS

| | | | |
|---|---|---|---|
| 2,800,172 | 7/1957 | Romer et al. | 158/1 |
| 3,167,039 | 1/1965 | Wilsdon et al. | 110/1 |
| 3,481,289 | 12/1969 | Oda et al. | 110/1 |
| 3,520,649 | 7/1970 | Tomany et al. | 423/244 |
| 3,746,498 | 7/1973 | Stengel | 431/4 |
| 4,018,868 | 4/1977 | Knight | 423/244 |
| 4,185,080 | 1/1980 | Rechmeier | 423/242 |
| 4,235,585 | 11/1980 | Anderson | 431/3 |
| 4,245,573 | 1/1981 | Dixit et al. | 110/343 |
| 4,331,638 | 5/1982 | Michelfelder | 423/210 |
| 4,396,434 | 8/1983 | Forster | 134/1 |
| 4,440,100 | 4/1984 | Michelfelder et al. | 110/343 |
| 4,444,128 | 4/1984 | Munro | 110/345 |
| 4,461,224 | 7/1984 | Michelfelder et al. | 110/345 |
| 4,555,996 | 12/1985 | Torbov et al. | 423/244 |
| 4,559,211 | 12/1985 | Feldman et al. | 423/244 |

Primary Examiner—Gregory A. Heller
Attorney, Agent, or Firm—Flehr, Hohbach, Test, Albritton & Herbert

[57] ABSTRACT

A method is provided for reducing the sulfur content of exhaust gases from a combustion installation comprising the steps of calcining the dry sorbent particles in a controlled temperature environment outside of the combustion installation, forming an aqueous dispersion of the calcined sorbent and injecting the aqueous dispersion into the combustion installation.

6 Claims, 1 Drawing Sheet

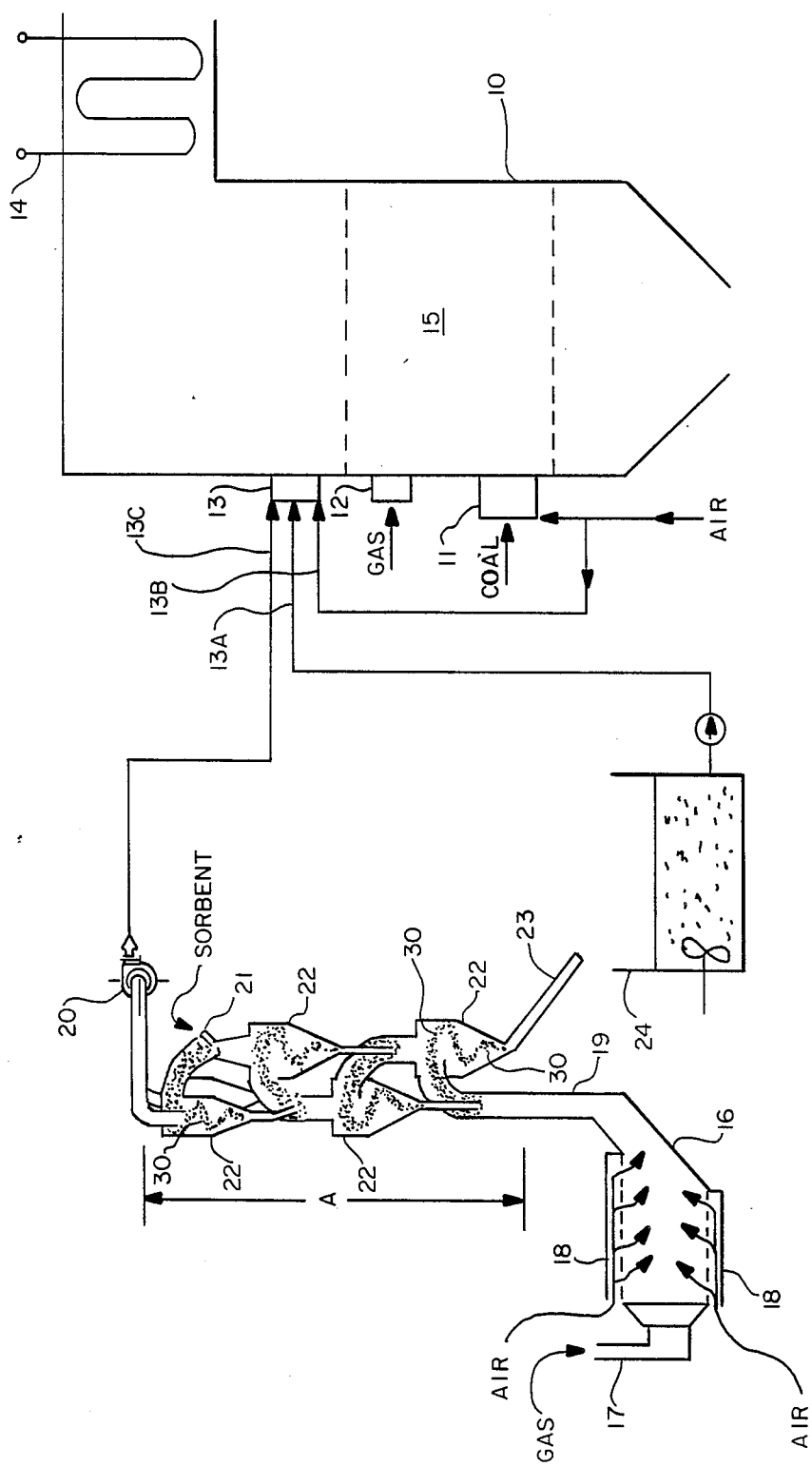

ENHANCED SORBENT INJECTION COMBINED WITH NATURAL GAS REBURNING FOR A SOX CONTROL FOR COAL FIRED BOILERS

The present invention is directed to an improved process for reducing the gaseous $SO_X$ in the combustion gases from fossil fuels.

BACKGROUND OF THE INVENTION

The use of fossil fuels in combustion installations (furnaces, boilers and the like) results in the production of sulfur-containing compounds, in particular, sulfur dioxide, which must be removed from the exhaust gases prior to release into the atmosphere. Various particulate additives are known, including calcium carbonate, magnesium carbonate, limestone, dolomite and calcium hydroxide, which react with sulfur dioxide in a manner which causes them to be sorbed onto these additives. The particulates then may be removed from the exhaust gases by various means, such as by filtration of the flue gas or electrostatic precipitation, and then discarded or recycled. The efficiency of such a sulfur scrubbing process depends in part upon the efficiency of contacting the particulate additives with the exhaust gases from the combustion installation. However, attempts to maximize efficiency have been complicated by the fact that reaction of the additives with sulfur dioxide occurs within a particular temperature range which is, in the case of calcium carbonate, about 2000 to 1000° F. Since the temperature within the combustion zone of a furnace is well above this temperature, i.e., usually 2600° F. and higher, the contact between the particulate additive (sorbent) and the gaseous combustion products must take place outside of the combustion zone to avoid sorbent deactivation. If the dry particulate additive is at any time exposed to a temperature above about 2000° F., significant sorbent deactivation occurs rendering the sorbent chemically useless for the desired sorption reaction. However, if the sorbent is added at a location in the furnace where the temperature is too low, the desired reaction will not readily occur.

Therefore, there is in the art a problem of achieving optimum dispersion of the particulate additive within the combustion gas stream, contacting the particulate additive with the gas stream at the favorable temperatures (2000°–1600° F.), while minimizing or eliminating exposure of the particulates to a temperature above about 2200° F.

Various methods are known to attempts to deal with this problem. According to one known method, the additives are introduced in a dry form into the combustion region above the combustion zone with the aid of air jets. See U.S. Pat. No. 110 -345 However, this subjects the solid additives to the entire temperature spectrum of the flame and furnace, which leads to deactivation of a substantial portion of the additive.

According to another known method, the solid additives are premixed with the fuel (such as coal) before the fuel is introduced into the combustion region. See U.S. Pat. No. 3,746,498. Since the fuel is introduced directly into the combustion zone, this subjects the additives to the extreme temperatures within the combustion zone, thereby leading to deactivation and loss of additive activity.

According to a third known method, the dry additives are injected with the secondary air into the burner around the combustion zone. See U.S. Pat. No. 4,331,638. Again, this leads to substantial deactivation of the additive.

According to a fourth known method, the dry additive is injected below the burner zone (combustion zone), which leads again to sorbent deactivation due to the high temperature. See U.S. Pat. No. 4,440,100.

In U.S. Pat. No. 4,555,996, commonly assigned a process is described for reducing the gaseous sulfurcontaining products in gases resulting from combustion of fossil fuels by injecting chemical additives as aqueous dispersion into the combustor in a zone which is outside of the combustion region, but which is at a temperature exceeding about 2200° F. The spray composition is injected at such a location, velocity and liquid droplet size that it remains substantially aqueous as it disperses within the combustion gases and thereafter flows with the combustion gases, while water in the particles evaporates, into a second zone having an upper temperature limit of about 2200° F. A substantial portion of the spray composition is thereby converted to solid particulate matter which, within the second zone, is capable of reacting with the sulfur-containing gases.

The present invention is an improvement upon the process described in U.S. Pat. No. 4,555,996.

Therefore, is it an object of the present invention to provide an improved method for reducing the gaseous sulfur-containing products in gases resulting from combustion of fossil fuels.

It is another object of the present invention to provide a method for reducing the gaseous nitrogencontaining products in the gases resulting from combustion of fossil fuels.

These and other objects and advantages of the present invention will be apparent from the following specification, accompanying drawing and appended claims.

SUMMARY OF THE INVENTION

The present invention provides an improved process for reducing the sulfur content of exhaust gas from a combustion installation. An aqueous dispersion of a sorbent is injected into a first zone within the combustion installation outside the combustion zone, where the temperature within the first zone exceeds 2200° F., and thereafter the sorbent particles disperse within the combustion products while water in the spray evaporates and flows into a second zone where the temperature has an upper limit of about 2200° F. In this second zone a substantial portion of the spray composition, by evaporation of water, is converted to solid particulates which, within the second zone, are capable of reacting with the sulfur and nitrogencontaining gases. The improvement according to the present invention involves preparation of the aqueous dispersion prior to injection into the combustion installation.

The improvement comprises the steps of mixing dry solid particulates (sorbent) with combustion gases from combustion of hydrocarbon gas or oil at a temperature in the range of 1800–1900° F. for 1.5–2.0 seconds, to form a calcined solid sorbent capable of reacting with or sorbing sulfur-containing gases; mixing the calcined solid sorbent with water to form an aqueous dispersion; and injecting the aqueous dispersion into the combustion installation in a zone outside of the combustion region such that the aqueous dispersion is initially exposed to temperatures exceeding about 2200° F. The solid particulates may comprise calcium carbonate, magnesium carbonate, calcium hydroxide, magnesium hydroxide, or mixtures of any two or more thereof.

BRIEF DESCRIPTION OF THE DRAWING

In the accompanying FIGURE, there is illustrated a system for preparing an aqueous sorbent composition according to the present invention and for injecting the composition into a wall-fired combustion installation.

DESCRIPTION OF THE PREFERRED EMBODIMENTS

In commonly assigned U.S. Pat. No. 4,555,996, an aqueous dispersion containing a sorbent which reacts with sulfur-containing gases is sprayed into a combustion installation. Once injected, at least three events must take place between the point of injection of the aqueous spray and the locus within the combustion installation or flue where the dry solid particulate matter will be in contact with the sulfur-containing gases at the desired temperature, which is in a range of about 1800°–2200° F. The three events are as follows. Firstly, the aqueous droplets must be welldispersed within the conduit containing the sulfurcontaining gases so that maximum contact of the sulfur species is obtained. Secondly, the moisture in the aqueous droplets must evaporate. Thirdly, certain preparatory chemical reactions must occur to prepare the particulate matter for reaction with the gaseous sulfur species. In the case of calcium carbonate (limestone), for example, most of the calcium carbonate particles calcine to lime. Once the water has evaporated, the third process, i.e., the calcination, takes place in less than about 0.25 seconds, provided the temperature is above 2000° F. As disclosed in the patent, a typical residence period for water droplets of the size of about 100 microns in diameter containing calcium carbonate particles of about 50 microns in diameter, when exposed to a temperature in the range of 1800–2500° F., is approximately one second. According to the patent, the elapsed time from injection into the combustion installation to reaction with sulfur-containing gases is about 2.7–2.8 seconds. About two seconds of this period is for dispersion of the droplets while the water is being evaporated, and from 0.7–0.8 seconds is the residence time of the dry particles within a temperature window of about 1800°–2500° F. The optimum temperature window for reaction of the dry particles with the sulfur and nitrogen-containing gases is about 1500°–1900° F. However, in the patent about 0.25 seconds of this 0.7–0.8 seconds period is utilized to prepare the dry particle for its chemical reaction, i.e., to calcine the dry particle. The present invention improves the process of the patent by providing a method for calcining the sorbent particle prior to injection into the combustion chamber and prior to the preparation of the aqueous dispersion, so that this entire 0.7–0.8 second residence period within the combustion installation in the favorable temperature window is dedicated to the reaction which reduces $SO_X$.

To the extent that the present description involves known combustion installations and methods of injecting aqueous spray dispersions into such installations, the disclosure of U.S. Pat. No. 4,555,996 is incorporated by reference herein.

The sorbent additives which may be used which react with gaseous sulfur-containing species include, either singly or in mixtures of two or more of the following: limestone, calcium carbonate (or hydrate), magnesium carbonate (or hydrate) produced by various processes, similar sodium or potassium-based components, other alkali and alkali earth metals, magnesium hydroxide, and calcium hydroxide. These are usually provided in the form of limestone (calcium carbonate), dolomite, magnesite, and hydrated calcium hydroxide. Calcium carbonate is the most preferred sorbent according to the present invention.

For the purpose of describing the preferred embodiments of the present invention, reference will be made to the accompanying FIGURE which shows a conventional wall-fired coal-burning combustion installation. However, as will be recognized by those skilled in the art, the method according to the present invention may be applied to other types of combustion installations, including tangentially fired installations, as well as to combustion installations which are adapted to fire other types of fossil fuels. Referring to the FIGURE, the combustion installation 10 is equipped with inlets 11 for fuel and air (the fuel being coal in this instance), and inlets 12 for additional gaseous fuel (a hydrocarbon gas, such as natural gas, methane, ethane, propane, butane, or mixtures of any two or more of these gases). The fuel burns within a combustion zone, approximated by the dashed lines defined in area 15. Outside of the combustion zone, there are inlets 13A for introducing aqueous sorbent dispersion through jets (not shown) using the force from air source 13B, and an inlet 13C for the exhaust of the sorbent calcination step. Also shown is a heat exchanger 14 in heat exchange relationship with the combustion gases as they enter the flue system.

To calcine the sorbent a burner 16 fed by hydrocarbon gas, such as natural gas, through inlet 17 and by air through manifold 18, produces an exhaust mixture at a temperature of about 1900° F. where the exhaust enters the duct system 19. The upward flow of exhaust gases through the duct 19 is enhanced by fan 20. The dry sorbent 30 is introduced through inlet 21 and cascades through a series of mixing chambers 22 against the upward flow of the hot gases. The particle size of the sorbent and the velocity of the upward flowing gases are adjusted so that the amount of sorbent which is wasted by falling into duct 19 back into the burner 16 is minimized. The calcined sorbent ultimately exits through outlet 23 into tank 24 containing water where it is mixed to form an aqueous dispersion.

The parameters such as the size of the sorbent, the rate of introduction of the sorbent through inlet 21 and the velocity of upwardly flowing gases through duct 19 may be adjusted to control the average residence time that the sorbent spends within the mixing chambers 22. It is preferred that from the point of introduction of the sorbent to the point that it is released into the water tank 24 should be about 1.5–2.0 seconds. During this residence period the sorbent will be exposed to a temperature of around 1900°–1800° F., which is particularly desired to effect the calcination of the sorbent. The water slurry in tank 24 is then introduced by injection through line 13A with air from line 13C into the combustion installation 10 at a location outside of the combustion zone 15. Methods and means of injecting the aqueous sorbent into the combustion installation 10 are disclosed elsewhere in commonly assigned U.S. Pat. No. 4,555,996 which is incorporated herein by reference. As is the case with the process disclosed in U.S. Pat. No. 4,555,996, when the aqueous sorbent is injected into the combustion installation 10, during the first approximately 2 seconds there is intimate mixing of the sorbent with the combustion gases and flow of the sorbent toward the flue system where the temperatures are somewhat cooler, i.e., below about 2000° F. During this time the sorbent is protected by the presence of water. Once the sorbent reaches the area in the flue system where the temperatures are below 2000° F., the water has evaporated and the sorbent is able to react with the sulfur and nitrogencontaining components of the combustor gases, thereby removing such gases.

It is an advantage of the present invention that once the water in the sorbent is evaporated, the entire residence time (estimated to be around 0.7-0.8 seconds in a normal case) is dedicated to reaction of the sorbent with the sulfur-containing gases and virtually none of the residence time is wasted effecting the necessary calcination reaction to prepare the sorbent. Thus, the $SO_2$ reduction of flue gas in a typical combustion installation will be over 80%.

It is a further advantage of the present invention that secondary air utilized through line 13B may be used as sorbent jet transport for injection, thereby simplifying modification of the combustion installation in order to utilize the present invention.

It is a further advantage of the present invention that the calcination exhaust gas utilized through line 13C is injected into the combustion installation to suppress thermal $NO_X$ formation during carbon monoxide and hydrocarbon burnout within the combustor. The exhaust gas introduced through line 13C contains virtually no nitrogen or sulfur-containing gases.

The recirculation of the calcination exhaust through line 13C into the combustor also helps to offset the heat dissipation caused by the injection of an aqueous stream into the combustor, thereby essentially retaining superheater performance of the combustion installation without major hardware modifications.

It is another advantage of the present invention that since the sorbent calcination occurs outside of the combustor, coal ash interaction with the sorbent during calcination is avoided. This is a disadvantage of the process of U.S. Pat. No. 4,555,996 wherein the sorbent calcination takes place within the combustion installation where coal ash may both physically and chemically interfere with the sorbent.

It is yet another advantage of the present invention in that during calcination the sorbent is protected from sintering since it is calcined in a temperature-controlled atmosphere within the mixing chambers 22, as opposed to being calcined at the combustion installation 10, where tremendous temperature variations exist.

The calcined calcium or magnesium sorbent produced according to the present invention will thus develop a high surface pore structure, i.e., about in the range of 60-80 $m^2/gm$.

The present invention provides an $SO_2$ control for coal burning with relatively minor equipment and retrofit modification to existing combustion installations.

The foregoing description of the preferred embodiments of the invention is provided for purposes of illustration and description. It is not intended to be exhaustive, nor to limit the invention to the precise form disclosed, and obviously many modifications and variations are possible in light of the above teachings. The embodiments were chosen and described in order to best explain the principles of the invention and their practical application to thereby enable others skilled in the art to best utilize the invention and the various embodiments. It is intended that the scope of the invention be defined by the claims appended hereto It is claimed that:

1. In a process for reducing gaseous $SO_X$ content of exhaust gases from a combustion installation, by injecting an aqueous dispersion of a particulate sorbent into said combustion installation in a zone outside of the combustion region such that said aqueous dispersion is initially exposed to a temperature exceeding about 2200° F.; the improvement comprising, prior to said step of injecting said aqueous dispersion into said combustion installation, the steps of
    (a) mixing substantially dry solid particulates with combustion gases from the combustion of hydrocarbon gas at a temperature in the range of about 1800°-1900° F. for 1.5-2.0 seconds to form a calcined solid sorbent capable of reacting with sulfur-containing gases; and
    (b) mixing said calcined solid sorbent to form an aqueous dispersion for injection into said combustion installation; wherein said solid particulates comprise calcium carbonate, calcium hydroxide, magnesium carbonate, magnesium hydroxide or mixtures of any two or more thereof.

2. A process according to claim 1 wherein said step (a) comprises flowing said particulates through a conduit against a counterflowing gaseous stream comprising said combustion gases of said hydrocarbon gas.

3. A process according to claim 1 wherein said hydrocarbon gas is selected from the group consisting of natural gas, methane, ethane, propane, butane and mixtures of any two or more thereof.

4. A process according to claim 2 wherein said counterflowing gaseous stream, after contact with said particulates, is introduced into the flue gas recirculation system of said combustion installation.

5. A process according to claim 1 wherein said combustion installation fuel comprises coal.

6. A process according to claim 1 wherein said particulates comprise calcium carbonate.

* * * * *